United States Patent [19]

Schaefer

[11] 3,740,555
[45] June 19, 1973

[54] TWIN BEAM INFRARED ABSORPTION ANALYZER

[75] Inventor: Werner Schaefer, Kelkheim, Taunus, Germany

[73] Assignee: Hartmann & Braun Aktiengesellschaft, Frankfurt am Main, Germany

[22] Filed: July 22, 1968

[21] Appl. No.: 746,618

[52] U.S. Cl. .......................... 250/43.5 R
[51] Int. Cl. .......................... G01n 21/34
[58] Field of Search .................. 250/43.5

[56] References Cited
UNITED STATES PATENTS

| | | | |
|---|---|---|---|
| 2,718,597 | 9/1955 | Heigl et al. | 250/43.5 |
| 2,951,939 | 9/1960 | Luft | 250/43.5 |
| 3,123,295 | 3/1964 | Martin | 250/43.5 X |
| 3,430,041 | 2/1969 | Kaye | 250/43.5 |

Primary Examiner—William F. Lindquist
Attorney—Ralf H. Siegemund

[57] ABSTRACT

A modulated twin beam selective radiation absorption monitoring analyzer. Beam modulation is converted to modulated electrical quantity fed to an amplifier and thence to a rectifier to give reading, the rectifier having a sensitivity threshold exceeding the amplified zero drift prior to rectification. Sample cell length is chosen such that the amount of absorption therein is in the range of 40 to 60 percent. The absorption by a sample of known composition is simulated by a change in beam intensity.

3 Claims, 4 Drawing Figures

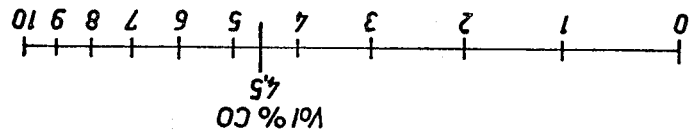
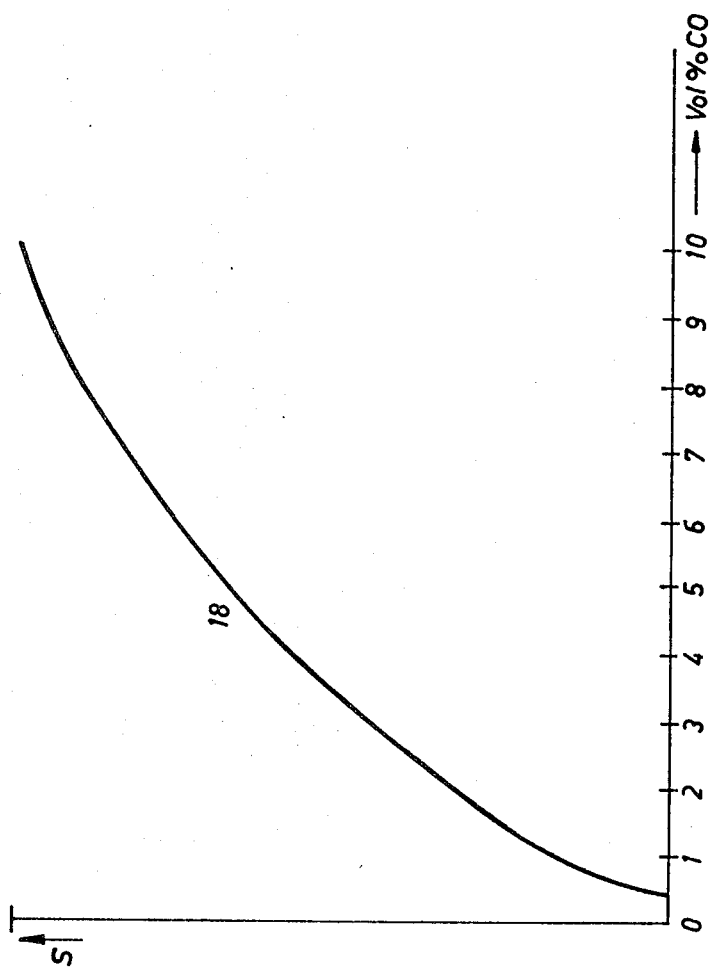

TWIN BEAM INFRARED ABSORPTION ANALYZER

BACKGROUND OF THE INVENTION

1. Field of the invention

A twin beam analyzer making use of selective absorption with beam modulation electrically detected and resulting current is rectified.

2. The Prior Art

There are well known selective twin-beam infra-red gas analyzers comprising a measuring and a reference beam, beam modulation and phase-independent rectification of the output voltage of an amplifier associated with an electrically operated radiation detector. The operating principle of such gas analyzers is well known. However, in such instruments it is desirable that the concentration of the measured gas be indicated by the associated measuring instrument on a substantially linear scale. Linearity is substantially achieved by so choosing the length of the measuring cell that the selective absorption of radiation by the measured component in the cell is relatively slight and does not ever exceed 40 percent. Up to this degree of absorption the relationship between the concentration of the measured gas in percent by volume and the output signal, i.e., the current through the electrical indicating instrument, is approximately linear.

With reference to the measuring properties of this instrument it should be observed that it is liable to instability of its zero point and of its sensitivity due to optical asymmetries caused by technical factors. As a matter of experience the asymmetry which can be expressed by the quotient $(\Delta I)/I$ may be $\pm 0.1$ percent per week where $\Delta I$ is the intensity difference between the two beams due to zero point drift and I is the radiation intensity in the absence of the measured gas at complete zero balance. The measuring error due to zero point drift may assume considerable proportions in course of time. For maintaining the instrument it is therefore essential that the zero point as well as the end point of the measuring range should be checked daily and at least weekly and the instrument rebalanced by adjusting means, test gases being normally used for this purpose. The considerable amount of work thus involved in maintaining the instrument cannot be avoided in prior art instruments if the guaranteed accuracy is to be achieved throughout the measuring range.

Now there are special applications of an infrared gas analyzer in which the instrument is principally used as a portable piece of equipment and where extreme measuring accuracy is not needed. These are for instance cases in which a given, relatively low, concentration limit is to be monitored. An illustrative case is, for example, the supervision of the content of carbon monoxide in the exhaust gas of an internal combustion engine, where a maximum concentration of 4.5 percent by volume of CO is prescribed. A determination of concentrations in the direct vicinity of zero or less than 1 percent by vol. of CO, and considerably beyond the upper limiting concentration, i.e. greater than 6 to 8 percent by volume of CO, is not wanted, since such concentrations are of no interest. In this and similar cases a measuring accuracy of $\pm 5$ percent related to the end of the measuring range at 10 percent by volume of CO is quite adequate.

The object of the present invention is the provision of a twin-beam infrared gas analyzer of the specified type which is suitable for these latter special applications. The problem is that of providing an instrument of the greatest possible simplicity comprising the simplest possible means for checking and readjusting this instrument with special regard to the probability that the instrument will not be used by skilled personnel.

SUMMARY OF THE INVENTION

According to the present invention there is provided a selective twin-beam infrared gas-analyzer for monitoring gas concentration comprising a measuring and a reference beam, modulation of the beams and phase-independent rectification of the output voltage of an amplifier associated with an electrically operated radiation detector in which the length of the cell is so chosen that the selective absorption in the measuring cell is between 40 and 60 percent at the monitored concentration limit. The phase-independent rectification of the output voltage of the amplifier is effected in a rectifier network which has a sensitivity threshold exceeding the amplifier output due to zero point drift prior to rectification; and at zero concentration the measuring and reference beams are so matched with respect to amplitude and phase that the output current of the amplifier is zero.

In a preferred embodiment of the invention as employed, for example, for monitoring the presence of CO in the exhaust gas of internal combustion engines, the length of the measuring cell for a concentration limit of 4.5 percent of CO is 10 mm and for other concentration limits of CO the length of the cell in millimeters is given by the quotient 45/Concentration limit.

For a check of instruments comprising a radiation source for both the measuring and reference beams, a fixed resistor is shunted across the filament radiating the measuring beam when the concentration of the measured gas is zero, the resistance being so chosen that the resulting weakening of the radiant source corresponds to the attenuation the limit concentration would cause, and the amplifier gain is adjustable. The adjustment of gain is effected by a control knob on the instrument. At the same time as the fixed resistor is shunted across the filament radiating the measured beam, a temperature-dependent resistor provided in the instrument is shunted across the indicating circuit, thereby to compensate the effect of the ambient temperature on the absorption experienced by the measuring beam in the measuring cell.

The advantages afforded by these features of the present gas analyzer will be understood as the description of an embodiment of an analyzer for measuring the CO content of the exhaust gases of engines.

BRIEF DESCRIPTION OF THE DRAWING

FIG. 3 is a graph illustrating the relationship between the concentration of the measured gas and the output signal of the analyzer, and FIG. 4 illustrates the graduation of the scale of the indicating instrument of the analyzer.

DESCRIPTION OF THE PREFERRED EMBODIMENT

Figure 1:
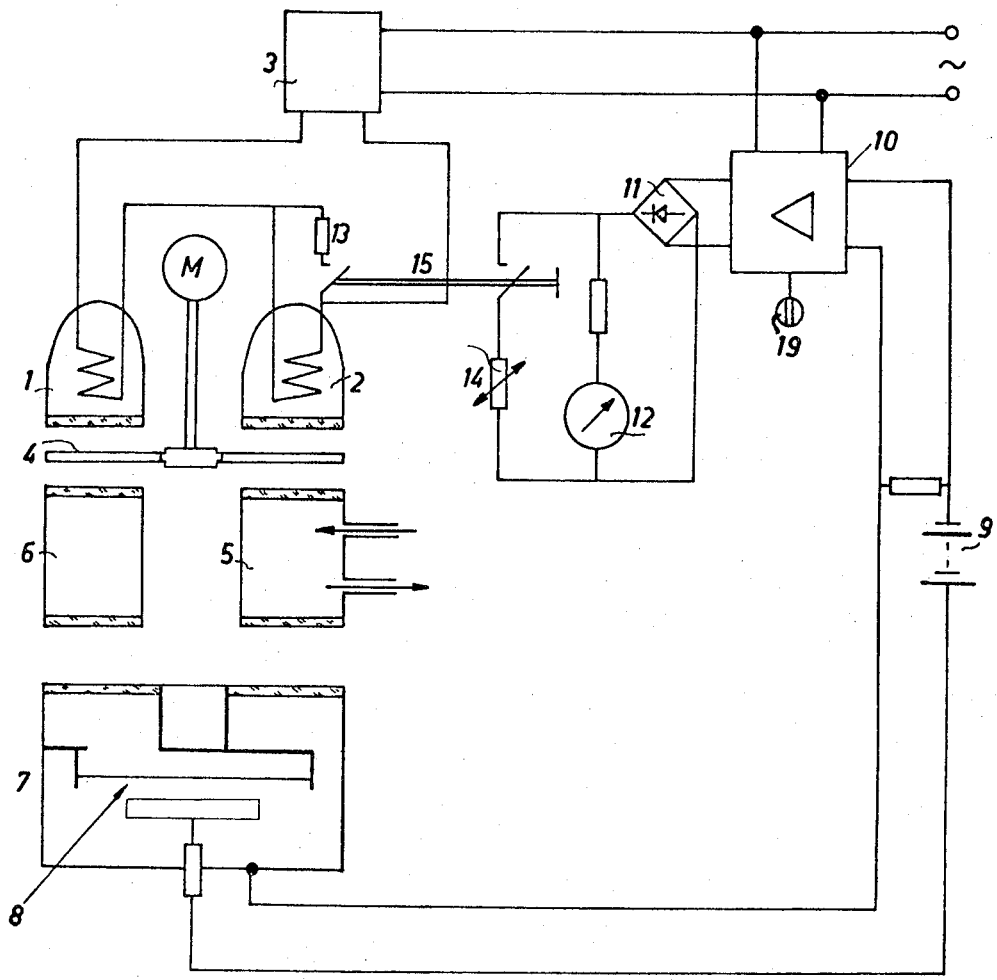
FIG. 1 is a diagram schematically representing the optical and the electrical parts of the gas analyzer.

With reference first to FIG. 1 the analyzer contains two sources of radiation 1 and 2 each constituted by an electrically heated filament fed from a commercial source of power through constant current supply unit 3. After modulation by a motor-driven rotary shutter 4, the two beams first travel through a measuring cell 5 and a reference cell 6 respectively and then enter the chambers of a detector which contains the gas that is to be measured. In conventional manner, a diaphragm capacitor 8 in the detector, supplied with potential from a battery 9, generates a signal which is amplified in a controllable amplifier 10 and then applied through a rectifier bridge 11 to an indicating instrument 12. The reference cell 6 contains a gas which does not absorb infrared radiation. The exhaust gas that is to be monitored flows through the measuring cell 5. The length of the measuring cell is so chosen that when the concentration limit of 4.5% CO in the gas has been reached the selective absorption of the beam will be 50 percent. This is the case when the length of the cell is 10 mm. Under these conditions the absorption in the measuring cell within a measuring range from 0 to 10 percent is represented by the curve 16 in FIG. 2. The curve considerably deviates from linearity. By way of comparison a second curve 17 is shown in the graph which is that obtained in an infrared gas analyzer calibrated to provide a characteristic that is as nearly as possible linear. Linearity is obtained by reducing the selective absorption in the measuring cell at the concentration limit of 4.5 percent by volume of CO to only 5 percent. The illustrated relationships are due to the effects of Lambert-Beer's law of absorption.

On the other hand, the relationship between absorption and output signal of the analyzer is linear. Thus the curve obtained for the output signal S as a function of the concentration of the measured gas is as reproduced by 18 in FIG. 3. Owing to the sensitivity threshold of the rectifier the curve does not begin at zero. The sensitivity threshold is roughly at 4 percent of the measuring range and exceeds the zero point drift of the analyzer. The graduation of the scale of the indicating instrument in FIG. 4 results from the curve in FIG. 3.

By the choice of a percentage absorption of 50 percent, which is unconventional in gas analyzers for a mean value in the measuring range, zero point stability is decisively improved.

Figure 2:
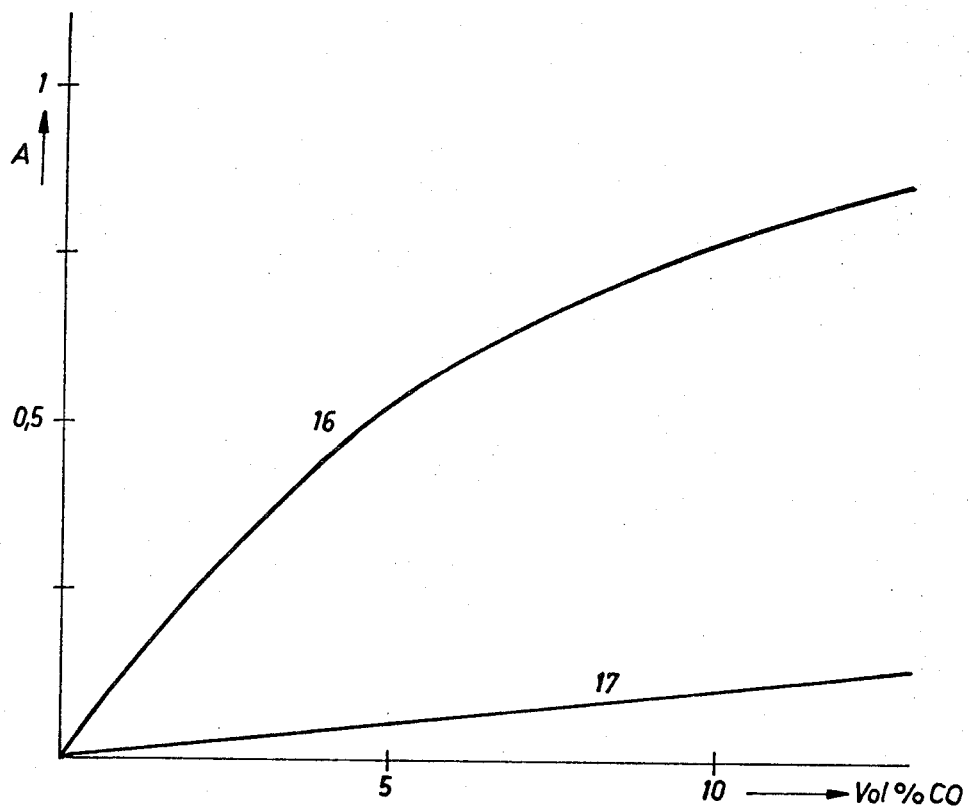
FIG. 2 is a graph illustrating the relationship between the percentage of the radiation absorbed by the measured gas in the measuring cell and the concentration of the measured gas, on the one hand in the case of an analyzer in which the absorption at the concentration limit is high and on the other hand in an analyzer in which this absorption is only one tenth of that in the first case.

Compared with the absorption conditions at low percentage absorptions as represented by the curve 17 in FIG. 2 which leads to a linear calibration curve, zero point drift is reduced by one order of magnitude. In conjunction with the sensitivity threshold of the rectifier this affords the advantage that the zero point of the analyzer will remain stationary over long periods when a first calibration of the instrument the measuring and reference beams at zero concentration have been so matched with respect to amplitude and phase that the output current of the amplifier is zero. Matching is done with the aid of means conventional for such a purpose, such as by the interposition of stops in the paths of the beams. The optical zero point is thus determined in principle. An extremely accessible adjusting means for zero point correction is not required. If at zero concentration of the measured gas zero drift should nevertheless be observed to occur, then this would indicate that the instrument is faulty.

The non-linearity of the scale is quite acceptable. Nevertheless a measuring accuracy of ± 5 percent at the end point of the scale is still guaranteed down to a measurement of 1 percent by volume of CO.

The high percentage absorption in the measuring cell provides the radiation detector with a relatively powerful signal. Contrary to the high gain amplifiers otherwise used the amplifier associated with the proposed analyzer need not have a high gain and may therefore be simpler. As will be understood from the following explanations the gain is adjustable.

For a functional check and for correcting sensitivity changes of the analyzer a special circuit is provided. As illustrated in FIG. 1, this comprises a fixed resistor 13 and a temperature-dependent resistor 14. A manually operable switch 15 permits a resistor 13 to be shunted across the radiating filament of the radiation source 2 and at the same time the resistor 14 to be connected in parallel to the indicating circuit of the indicating instrument 12. The resistance of 13 is so chosen that when connected in the shunt the resultant reduction in intensity of the beam will simulate the intensity reduction that would be obtained at the concentration limit. When both resistors are thus in circuit the indication given is checked. If the pointer of the indicating instrument does not then exactly show a concentration of 4.5 percent by volume of CO, the indication must be corrected by adjusting the gain of the amplifier 10 by turning a knob 19. In this simpke check and readjustment, which can be quickly repeated as frequently as may be desired, the purpose of the temperature-dependent resistor 14 is to simulate the change in absorption of a gas containing 4.5 percent by volume of CO in the measuring cell due to a change in temperature. When this functional check has been performed the switch 15 is opened again and the instrument is then ready for measuring. The provision of the temperature-dependent compensating resistor 14 does not mean that the analyzer requires temperature compensation. When a measurement is being made there is no dependence of the indication upon the ambient temperature, since changes in the different temperature-sensitive components of the instrument in their totality are self-compensating.

The infrared gas analyzer of the present invention therefore has only two control elements, namely a switch for a functional check and a control knob for adjusting sensitivity.

With reference to a choice of a percentage absorption of 40 to 60 percent at the concentration limit it may be observed that low percentage absorption cannot provide zero point stability for longer periods when accurate measurements are required in the neighborhood of the zero point and the measuring accuracy at higher percentage absorptions is too low.

I claim:

1. In a selective twin beam infrared analyzer for monitoring gas for a component of maximum limited concentration, a pair of electric radiators connected to a source of stabilized electric power for producing twin beams, the analyzer having a zero drift tendency, and cells for containing reference and sample gas respectively in said beams, means for modulating the beams, a detector for translating the modulated beams passing through the cells to electrical voltage, an amplifier receiving the voltage as input, a phase-independent rectifier for rectifying the output of the amplifier, and an electrical measuring instrument connected to the rectifier for indicating the output thereof as a measure of concentration of the component, the improvement comprising the sample cell being of a length such that absorption is between 40% and 60% at the maximum limit of component concentration, said amplifier having a variable gain control and rectifier having a sensitivity threshold voltage greater than the output voltage of the amplifier due to zero drift thereof and prior to rectification, and at zero concentration of the component, the measuring and reference beams being so matched with respect to amplitude and phase that the output current of the amplifier is zero; a fixed resistor, a switch for selectively shunting the resistor across the radiator for the measuring beam to reduce the intensity of same before passing through the sample cell, the the resistance of the resistor being of the value to reduce the intensity of the measuring beam by the amount corresponding to the attenuation of the matched measuring beam passing through the sample cell when the latter contains sample gas at the maximum limit of concentration, for checking the functioning of the analyzer; means for varying the gain of the amplifier; a temperature-dependent resistor selectively connected across the measuring instrument; and a switch ganged with the first mentioned switch for shunting the temperature-dependent resistor across the measuring instrument when the measuring beam is reduced in intensity by closure of the first mentioned switch, for compensating the effect of the ambient temperature on the percentage absorption of the measuring beam in the sample cell.

2. In an analyzer as claimed in claim 1 for monitoring the CO content in exhaust gases of an internal combustion engine, the length of the sample cell in millimeters being the quotient 45/maximum concentration limit of CO % vol.

3. In an analyzer as claimed in claim 2, the maximum concentration of CO being 4.5 percent.

* * * * *